Dec. 11, 1962    J. BOYCE ETAL    3,067,849
CONVEYOR SYSTEM
Filed May 23, 1960
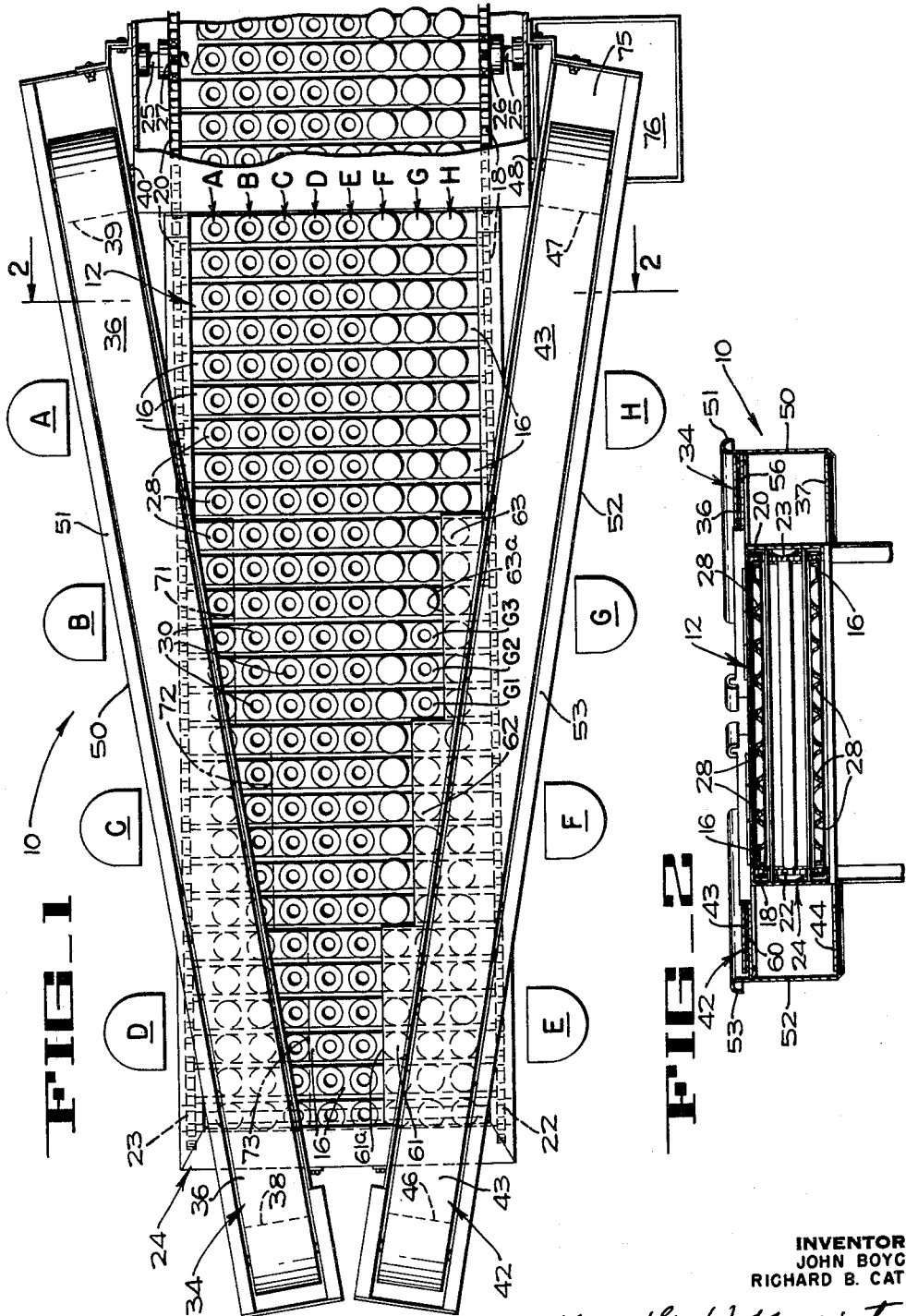
INVENTORS
JOHN BOYCE
RICHARD B. CATTO
BY Hans G. Hoffmeister.
ATTORNEY Patented Dec. 11, 1962

3,067,849
CONVEYOR SYSTEM
John Boyce, San Jose, and Richard B. Catto, Saratoga, Calif., assignors to FMC Corporation, a corporation of Delaware
Filed May 23, 1960, Ser. No. 30,827
12 Claims. (Cl. 198—19)

The present invention pertains to a conveyor system and more particularly relates to apparatus for facilitating the manual placing of articles into carriers of a conveyor.

An object of the present invention is to provide an improved conveyor system.

Another object of the invention is to provide structure facilitating the hand transfer of objects from one conveyor to another in a manner which does not mentally fatigue the operators.

Another object of the invention is to provide an improved arrangement of belt conveyors for transporting objects to, and away from, operators who transfer the objects from one of the conveyors to another.

Another object is to feed whole tomatoes to a tomato preparation machine in an improved manner.

Another object of the invention is to manually place articles into cups of a high speed conveyor in an improved manner.

These and other objects and advantages of the invention will be apparent from the description and the accompanying drawings, wherein:

FIGURE 1 is a diagrammatic plan view of a portion of a tomato preparation machine and a feed conveyor system therefor, constructed according to the present invention.

FIGURE 2 is a transverse vertical section of the feed conveyor taken along section line 2—2 of FIGURE 1.

The embodiment of the invention which will be disclosed herein is one in which the improved conveyor system is a part of a tomato preparation machine 10 (FIG. 1). This machine includes an endless feed conveyor 12, which is powered to move toward the right (FIG. 1) through the machine at a high speed by a conveyor driving means (not shown) that is a part of the overall machine 10. The feed conveyor 12 comprises a plurality of elongate plate members 16 which are fastened at their ends to a chain 18 and a chain 20 (FIG. 2), respectively. At the left hand end of the machine (FIG. 1) the chains 18 and 20 are trained around sprockets 22 and 23, respectively, which are suitably mounted for rotation in a framework 24. The chains are also supported by sprockets 26 and 27 which are journalled on a transverse drive shaft 25. The plate members 16 each contain a number of shallow cup-like depressions 28 each of which has a central opening 30 in the bottom thereof. There are eight such depressions spaced along each plate member 16 of the feed conveyor 12, and each cup 28 is adapted to receive and transport a tomato into the preparation machine 10. The cups in the adjacent plate members 16 are aligned in the direction of movement of the feed conveyor 12 and the cups, as thus aligned, are seen to lie in eight distinct lanes. These eight lanes are designated, A, B, C, D, E, F, G, and H, respectively, as shown in FIGURE 1.

The preparation machine 10 into which the fruit is advanced is designed to operate on whole tomatoes entering with their stem-ends facing down. Consequently, to ensure that the tomatoes are all oriented in this manner, the tomatoes are individually placed on the feed conveyor by hand. Eight operators are employed to place the tomatoes on the feed conveyor 12. The operators sit on stools which define operator stations A through H. The station A operator supplies lane A with tomatoes; and the operators at stations B through H service lanes B through H, respectively, as will be more fully explained.

A flat-belt supply conveyor 34 (FIG. 1) is located in front of operator stations A–D and extends diagonally across a portion of the feed conveyor 12. The supply conveyor 34 includes an upper run 36 which is supported to move in a horizontal plane that is spaced a short distance above the upper surface of the upper run of the feed conveyor 12. The lower run 37 (FIG. 2) of the supply conveyor 34 returns below the level of the lower run of the feed conveyor 12. The supply conveyor 34 is trained around pulleys 38 and 39 at its ends and is driven by a drive shaft 40 so that the upper run 36 of the supply conveyor 34 moves from left to right as seen in FIG. 1.

A second diagonal flat belt supply conveyor 42 is located in front of operator stations E–H and between these stations and the feed conveyor 12. The second supply conveyor 42 includes an upper run 43 and a lower run 44 (FIG. 2). The second supply conveyor is trained around pulleys 46 and 47 and is driven by a drive shaft 48 so that the upper run 43 moves from left to right as seen in FIG. 1.

Tomatoes are diverted from an input conveyor (not shown) onto the left ends of the two diagonal supply conveyors 34 and 42. The supply conveyors transport the tomatoes past the individual operators at the several stations. The supply conveyors 34 and 42 are mounted diagonally above the feed conveyor so that the operator can easily reach the lane which he is servicing.

Suitable sheet metal guards are attached to the framework 24 to adequately enclose the moving machinery. A guard 50 (FIG. 2), having a rolled upper edge 51, extends along the conveyor 34 and a similar guard 52, having a rolled upper edge 53, extends along the conveyor 42. A horizontal plate 56 fastened to the guard 50 extends below and supports the upper run 36 of the conveyor 34. Similarly, a horizontal plate 60 attached to the guard 52 extends below and supports the upper run 43 of the conveyor 42.

The plate 60 includes horizontal projections 61, 62, and 63 which lie over the feed conveyor 12 and these projections mask portions of lanes F, G, and H, respectively, from the operators. The long edge 61a of projection 61 extends parallel to the lanes A–H of the feed conveyor, and lies between lanes E and F so that the projection 61 functions as a mask, masking lane F from the view of operator E so that, immediately in front of him, operator E sees none of the lane F cups and all of the lane E cups. The mask and adjacent supply conveyor frame work therefore define an article-depositing or feeding station opposite each operator's station. It is to be noted that the article-depositing stations and the operator stations are disposed in parallel lines, the distance between a particular operator station and the associated article-depositing station being substantially equal to the distance between each of the other operator stations and its associated article-depositing station. Operator E fills all the cups 28 in lane E by removing the tomatoes from the conveyor 42 and placing them stem-end down in the cups. The operators are responsible for only one lane and no other. The operator at station G, to give another example, is responsible for lane G. The longitudinal edge 63a on the plate 63 at his station sharply defines his lane by masking lane H. Since lane F has already been filled by the operator at station F, operator G can with no mental effort see that cups G1, G2, and G3 (FIG. 1) are his responsibility and can effortlessly keep all the cups in lane G filled.

It will be apparent that plate 56 under supply conveyor 34 could be extended at three places to provide masks 71, 72, and 73 for the operators at stations B, C, and D, respectively. These three masks would function in the same manner as the masks 61, 62 and 63, just described. It will likewise be apparent that the diagonal supply conveyors 34 and 42 include framework which lies over the feed conveyor and functions as a mask. It has been found that, with experienced operators, little if any change in operator efficiency is experienced when the triangular masks 61, 62, 63, 71, 72, and 73 are removed from a system which previously used them or when these six masks are installed on a system which did not previously use them. The angularity of the feed and supply conveyors and the experience of the operators are two factors which are considered when deciding whether or not to include triangular masks in a particular system.

If a damaged or otherwise unsuitable tomato arrives on a supply conveyor, the four operators simply allow the unsuitable article to travel to the end of the conveyor where the article falls through an opening 75 in the framework into a box 76 provided to receive the unsuitable articles.

The described masks clearly define the lanes for which the operators are responsible, and the diagonal input conveyors transport the tomatoes to each operator's station where the tomatoes are in very close proximity to the lane which is the responsibility of the operator at that station. Since the operator is permitted to readily see only the lane he has been assigned, he can fill cups at a very rapid rate without being required to continually decide which cup to fill. If the operators were directed to fill any and all cups that are empty, they would operate at random, and there would be attempted duplication of work, that is, two tomatoes may be aimed at the same cup at the same time, and the work would proceed in a generally slow and inefficient manner. The present structure eliminates decision making, and attempted duplication of effort is no longer possible; the result is that the feed belt can be driven faster and the operators are more efficient because they are not mentally fatigued.

The present invention has been described in connection with a tomato preparation machine. It will be apparent, however, that the structure is not limited to the feeding of fruit such as tomatoes but can be incorporated into any machine requiring the placement of articles in general onto lanes of a conveyor.

The invention having been described, that which is claimed and desired to be protected by Letters Patent is:

1. A conveying system comprising a feed conveyor having a plurality of object-receiving lanes defined thereon, means for advancing the feed conveyor, a first supply conveyor spaced above one portion of said feed conveyor, a second supply conveyor spaced above another portion of said feed conveyor, means for advancing said supply conveyors, and means adjacent said supply conveyors for concealing portions of selected ones of the lanes.

2. A conveying system comprising a feed conveyor having a plurality of carriers disposed in parallel lanes extending in the direction of movement of the feed conveyor, means for advancing said feed conveyor, means defining a plurality of operator stations adjacent said feed conveyor, each station being associated with one of said lanes, the distance between one station and the associated lane being substantially equal to the distance between each of the other stations and its associated lane, a supply conveyor for supplying objects comprising an endless belt having one run thereof spaced above said feed conveyor, said run being adapted to travel diagonally across said feed conveyor to cover a portion of said feed conveyor between each station and its associated lane, and means for advancing said supply conveyor whereby an operator at each station can conveniently and without excessive reaching remove objects from the supply conveyor and place the objects in the lane associated with that station.

3. Apparatus for increasing the efficiency of operators respectively responsible for the placement of an object in every cup of a particular lane of a longitudinally movable multi-lane cup conveyor, comprising a masking means disposed over a portion of said conveyor and defining a series of article-depositing stations, said stations being aligned diagonally with respect to the direction of movement of said cup conveyor, means defining an operator station opposite each article-depositing station, and a supply conveyor for transporting objects to the operators, said supply conveyor being located between said operator stations and their respective article-depositing stations and having a conveying surface movable in a direction substantially parallel to the diagonal line defined by said article-depositing stations, the distance between a particular operator station and the associated article-depositing station being substantially equal to the distance between each of the other operator stations and its associated article-depositing station.

4. Apparatus for increasing the efficiency of an operator having a station beside a multi-lane cup conveyor and responsible for placing an object in every cup of a particular lane of the multi-lane cup conveyor comprising a supply conveyor for transporting the objects to the operator, and means mounted adjacent said supply conveyor for concealing from the operator all lanes located between the operator and the particular lane for which he is responsible while leaving said particular lane exposed.

5. Apparatus for increasing the efficiency of operators respectively responsible for the placement of an object in every cup of a particular lane of a multi-lane cup conveyor, comprising a supply conveyor for transporting the objects to the operators, and means mounted adjacent said supply conveyor for concealing portions of lanes intermediate the operator and his particular lane which are the responsibility of other operators.

6. Apparatus for increasing the efficiency of an operator located beside a multi-lane cup conveyor and responsible for the placement of an object in every cup of a particular lane of the multi-lane conveyor comprising means located above the multi-lane conveyor for masking portions of lanes of the multi-lane conveyor which are not the responsibility of the operator, and means for transporting objects to the operator at a predetermined rate.

7. A conveying system comprising a feed conveyor having a plurality of carriers disposed in parallel lanes extending in the direction of movement of the feed conveyor, means for advancing said feed conveyor, means defining a plurality of operator stations adjacent said feed conveyor, each station being associated with one of said lanes, the distance between a particular station and the associated lane being substantially equal to the distance between each of the other stations and its associated lane, a supply conveyor for supplying objects comprising a conveyor surface spaced above said feed conveyor, said surface being adapted to move objects diagonally across said feed conveyor in the space between each station and its associated lane, whereby an operator at each station can conveniently and without excessive reaching remove objects from said surface and place the objects in the carriers of the lane associated with that station.

8. A conveying system comprising a feed conveyor having a plurality of object-receiving lanes defined thereon, means for advancing the feed conveyor, means defining object-feeding stations along said feed conveyor, said object-feeding stations being aligned substantially in non-parallel relationship to the direction of advance of said object-receiving lanes to place each object-feeding station approximately the same distance from a particular lane of the feed conveyor.

9. A conveying system comprising a feed conveyor having a plurality of substantially mutually parallel object-receiving lanes defined thereon, said lanes extending longitudinally of the feed conveyor, means for advancing said feed conveyor in the longitudinal direction, a plurality of feed-stations defined along said feed conveyor, said feed-stations being aligned on a line which is at a substantial angle to said lanes, and means for supplying objects to each of said feed-stations.

10. A conveying system comprising a feed conveyor having a plurality of parallel lanes extending in the direction of movement of the feed conveyor, means for advancing said feed conveyor, means defining a plurality of feed-stations along said feed conveyor, each feed-station being associated with one of said lanes, and object-supplying means located between the operators at their respective feed-stations and the associated lane for spacing each of said operators a predetermined distance from the associated lane, said distances being substantially equal.

11. A conveying system comprising a feed conveyor having a plurality of carriers disposed in parallel lanes extending in the direction of movement of the feed conveyor, means for advancing said feed conveyor, means defining a plurality of operator stations adjacent said feed conveyor, each station being associated with one of said lanes, the distance between one station and the associated lane being substantially equal to the distance between each of the other stations and its associated lane, object supplying means located between each station and its associated lane, said object supplying means being operable to cover a portion of said feed conveyor between the station and its associated lane whereby an operator at each station can conveniently and without excessive reaching remove objects from said supplying means and place the objects in the lane associated with that station.

12. Apparatus for increasing the efficiency of operators respectively responsible for the placement of an object in every cup of a particular lane of a longitudinally movable multi-lane cup conveyor comprising means defining a series of article-depositing stations upon said conveyor, said stations being aligned diagonally with respect to the direction of movement of said cup conveyor, means defining an operator station opposite each article-depositing station, the distance between a particular operator station and the associated article-depositing station being substantially equal to the distance between each of the other operator stations and its associated article-depositing station, and supply means intermediate said operator and article-depositing stations for transporting articles to each other.

References Cited in the file of this patent

UNITED STATES PATENTS

| | | |
|---|---|---|
| 1,270,501 | Dohm | June 25, 1918 |
| 1,445,797 | Peirce | Feb. 20, 1923 |

FOREIGN PATENTS

| | | |
|---|---|---|
| 118,841 | Australia | Aug. 17, 1944 |